United States Patent [19]
Classens

[11] Patent Number: 5,990,470
[45] Date of Patent: Nov. 23, 1999

[54] SCANNER SYSTEM AND METHOD FOR AUTOMATICALLY COMPENSATING MAIN-SCAN AND SUB-SCAN SENSOR POSITIONING ERRORS

[75] Inventor: Wilhelmus P. J. Classens, Castelostraat, Netherlands

[73] Assignee: Octe,acu etee-Technologies B.V., Ma Venlo, Netherlands

[21] Appl. No.: 08/991,248

[22] Filed: Dec. 16, 1997

[30] Foreign Application Priority Data

Dec. 19, 1996 [NL] Netherlands ............................ 1004831

[51] Int. Cl.$^6$ ...................................................... H04N 1/04
[52] U.S. Cl. ......................... 250/208.1; 358/474; 358/494
[58] Field of Search ................................ 250/234, 208.1; 358/474, 483, 494, 496

[56] References Cited

U.S. PATENT DOCUMENTS

| | | | |
|---|---|---|---|
| 4,337,394 | 6/1982 | Fukushima | 250/237 G |
| 4,449,151 | 5/1984 | Yokota et al. | 358/483 |
| 4,465,939 | 8/1984 | Tamura | 358/482 |
| 4,661,699 | 4/1987 | Welmers et al. | |
| 4,675,553 | 6/1987 | Shimizu | 358/448 |
| 4,675,745 | 6/1987 | Suzuki | |
| 4,712,134 | 12/1987 | Murakumi | 358/482 |
| 4,724,330 | 2/1988 | Tuhro | |
| 4,870,505 | 9/1989 | Mitsuki | |
| 5,117,295 | 5/1992 | Smitt | |
| 5,144,448 | 9/1992 | Hornbaker, III et al. | 348/324 |

FOREIGN PATENT DOCUMENTS

0284043A2  9/1988  European Pat. Off. .

Primary Examiner—Edward P. Westin
Assistant Examiner—Thanh X. Luu

[57] ABSTRACT

An apparatus for optically scanning a document to generate digital image data corresponding to local optical densities of the document including a fixed glass plate, one side of which defines an original image plane, a transporting mechanism for transporting the document in a sub-scanning direction in the original image plane, at least two linear sensors situated in a main scanning direction, each having an array of opto-electric converters and each provided with a lens which images on the sensor a linear observation area, situated in the original plane, wherein the observation areas of the sensors are substantially in line and partially overlapping at the ends in the main scanning direction. An aligning element is situated between the lenses and the original image plane at a short distance from the latter in a position such that its perpendicular projection onto the original image plane is situated within the overlapping ends of two adjoining observation areas, wherein the aligning element has a shape such that for each sensor in whose observation area it is situated the aligning element has a width in the main scanning direction which monotonically increases or decreases as a function of the sub-scanning direction.

14 Claims, 6 Drawing Sheets

SCANNER SYSTEM AND METHOD FOR AUTOMATICALLY COMPENSATING MAIN-SCAN AND SUB-SCAN SENSOR POSITIONING ERRORS

BACKGROUND OF THE INVENTION

1. Technical Field of the Invention

The invention relates to an apparatus for optically scanning a document to generate digital image data corresponding to local optical densities of the document, such apparatus frequently being termed a scanner. The invention more particularly relates to a scanner provided with a fixed glass plate, one side of which defines an original image plane; a transporting mechanism for transporting the document in a sub-scanning direction in the original image plane; at least two linear sensors situated in a main scanning direction, each including an array of opto-electric converters, and each provided with a lens which images a linear observation area onto the sensor situated in the original plane, the observation areas of the sensors being substantially in line and partially overlapping at the ends.

2. Description of Related Art

In a scanner of the type mentioned above, a document to be scanned is moved in one direction by the transporting mechanism while the sensors cooperate to scan a stationary linear area that is oriented perpendicular to the transport direction of the document. In this way, the document may be scanned two-dimensionally. The direction of the area scanned by the scanners is generally termed the main scanning direction and the transport direction is the sub-scanning direction.

In order to ensure that the document is completely scanned during the scanning operation, the sensors and their lenses are usually disposed such that their observation areas overlap somewhat at the ends. In practice, it is impossible to mount the sensors such that their observation areas are exactly in contact. Furthermore, maintaining exact contact between the observation areas is also impossible because the scanner is typically subjected to vibrations and impacts particularly during transport of the scanner.

Within the overlapping observation areas, the two sensors deliver redundant digital image data. Thus, a choice has to be made as to which data are passed and which are not, a marginal condition being that the transition from one observation area to the other observation area should not be visible in the final image.

There are various conventional techniques to deal with the transition between two sensors. For example, U.S. Pat. No. 4,657,745 describes a scanner provided with a movable glass plate on which the document to be scanned is placed. A narrow black line is provided in the transport direction on the glass plate and outside the area for documents. When the glass plate is in the home position, the black line is situated within the overlapping portions of the observation areas of the two sensors. The adjustment procedure searches for the image of the black line in the image data generated by the two sensors. The position of this black line in the image data is used as the transition from one sensor to the other to generate digital image data during scanning. The black line does not necessarily have to lie in the same plane as the document, but can, for example, be lower, e.g. at the bottom of the glass plate. In that case, the result of the adjustment procedure is corrected for parallax, by shifting the transition point, for both sensors, a predetermined number of pixels from their end.

U.S. Pat. No. 4,870,505 also relates to a scanner with a movable glass plate to receive a document. In the '505 patent, a test pattern (correction reference chart) having line patterns oriented in the direction of transport and triangle patterns that are disposed on the movable glass plate outside the area for documents. This test pattern is scanned during an adjustment procedure. In this way, the relative positions and the skew positions are calculated from the points of intersection of the test pattern with the observation areas of the separate sensors. The connecting points of the sensors are calculated from these data. Also, a correction can be carried out for a connection error in the transport direction between two skewed, adjoining sensors by buffering the image data of some scan lines during scanning and sourcing the outgoing image data from different image lines.

The above patents consistently utilize a movable glass plate on which a separate test pattern is provided outside the area reserved for the document to be scanned. However, there are also scanners which do not have such a movable glass transport system but in which the document to be scanned is conveyed by pairs of rollers over a narrow stationary glass plate mounted in the main scanning direction. This construction is simpler while maintaining accuracy and is certainly preferable for large document formats.

The above-mentioned adjustment techniques can only be used with a scanner having a stationary glass plate by making the test patterns in the form of documents (e.g. test cards). In that case, it is difficult to ensure that the test pattern is disposed with sufficient accuracy at the correct position.

To solve this problem, U.S. Pat. No. 5,117,295 replaces the test pattern with an aligning element situated between the lenses and the original image plane at a short distance from the latter in a position such that its perpendicular projection onto the original image plane is situated within the overlapping ends of two adjoining observation areas. This aligning element is formed by a thin wire in the transport direction and is disposed beneath the glass plate.

The pixels which correspond to the aligning element are then used in the '295 patent to determine the transition from one sensor to the next in the digital image data of the two observation areas. This is explained by reference to FIGS. 1A and 1B.

Figure 1A:
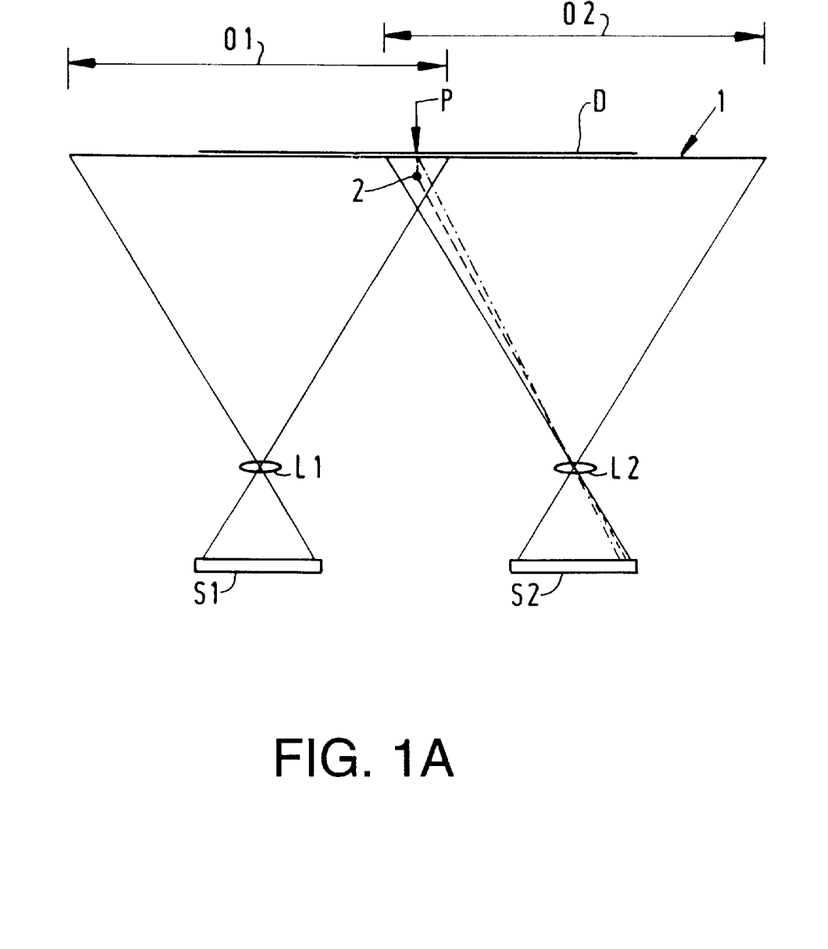
FIG. 1A is a diagram of a scanner with two sensor systems.

FIG. 1A is a sketch showing the principle of a scanner with two CCD sensors S1 and S2, on each of which part of the glass plate 1 (for the sake of simplicity the glass thickness is not shown) is projected by a lens L1 and L2 respectively. The portion of the glass plate projected onto each sensor is also termed an observation area (O1 and O2 are the observation areas of sensors S1 and S2, respectively). The transport direction of the document D to be scanned on the top of the glass plate 1 is perpendicular to the drawing plane.

In the overlapping part of the observation areas O1 and O2 of the sensors S1 and S2, an aligning element 2 in the form of a wire perpendicular to the drawing plane is disposed beneath the glass plate 1. Both sensors S1 and S2 thus detect aligning element 2. The projection P of the aligning element 2 onto the plane of the document D for scanning (the original image plane) is selected as the transition point where the digital image data from sensor S1 and the digital image data from sensor S2 are fitted together. The image data from the ends of the sensors outside the position corresponding to point P are not used.

Figure 1B:
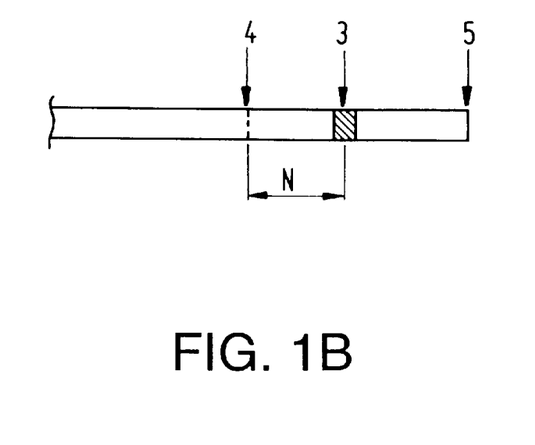
FIG. 1B shows part of the image projected on one of the sensors.

FIG. 1B shows the right-hand part of the image projected on to the sensor S1. The adjustment procedure searches for the middle 3 of the image of the aligning element 2 on the sensor and the measurement data of that point (pixel) is used as a reference. From point 3 a fixed number N of pixels are counted to find the transition point P (4). The number N can be determined experimentally or it can be preselected, whereafter the distance of the aligning element 2 from the glass plate 1 is adjusted until the required effect is obtained. During the scanning of documents, the measurement data from sensor elements between point 4 and end 5 of the projected image, and also the end of the sensor, are discarded. The remaining measured values are added to those from the other sensor, which has undergone the same procedure for determining the connecting point.

In this way, an accurate connection of the digital image from the various sensors can be obtained even for a scanner having a transport system without a moving glass plate. The advantage of these techniques is that any change of the mechanical adjustment of the sensors can be corrected automatically using digital techniques that do not require any mechanical action by a maintenance engineer.

However, the conventional art applies only to a distortion in the adjustment in the direction of the sensors themselves, the main scanning direction. A displacement of the sensors resulting in their observation areas no longer being in line, i.e. if the sensors are displaced relative to one another in the sub-scanning direction, cannot be determined in the above-described manner, let alone corrected. Such displacement, however, is quite possible and may occur, for example, if the apparatus is moved, transported or subjected to a physical shock. It is therefore desirable to be able to automatically compensate for displacement of the sensors in the sub-scanning direction as well as the main scanning direction.

SUMMARY AND OBJECTS OF THE INVENTION

An object of the invention is to provide an apparatus for allowing such automatic compensation of displacement of the sensors in the sub-scanning direction as well as the main scanning direction.

It is another object of the invention to provide a method for automatically compensating displacement of the sensors in the sub-scanning direction as well as the main scanning direction.

It is yet another object of the invention to improve the aligning element in a scanner to permit automatic compensation of sensor displacement in the sub-scanning direction as well as the main scanning direction.

To this end, the invention discloses an aligning element, which has a shape such that for each sensor in whose observation area it is situated the aligning element has a width in the main scanning direction that monotonically increases or decreases as a function of the sub-scanning direction.

As a result, it is possible to determine from the measurement data of a sensor what position the observation area of that sensor has in the sub-scanning direction, because there is a fixed relationship between the measured width of the aligning element and the position. In an adjustment procedure, the center of the projection of the aligning element onto the sensor is used to determine the transition point. In addition, the mutual distances of the two observation areas in the sub-scanning direction are determined from the width of the projection.

A suitable shape for the aligning element is one in which the width tapers linearly with the sub-scanning direction. In other words, the projection of the aligning element on the sensor is a triangle. Non-linear shapes are also possible, e.g. a bent or curved configuration. In this way the accuracy can be increased in a specific area.

In one embodiment, the aligning element is a narrow rod of tapering width mounted cantilever-fashion beneath the glass plate. A flat body situated in a plane beneath the glass plate and substantially parallel thereto is also suitable.

Another suitable embodiment of the aligning element is an assembly of two linear elements, e.g. two stretched wires or two thin rods, so fixed that their projections onto the original image plane extend at an angle to one another. For example, one element can be situated in the sub-scanning direction and the other in a direction forming an acute angle therewith. Another example is two elements each of which extends at an acute angle, of equal value but of different sign, to the sub-scanning direction and thus form a symmetrical figure.

The aligning element can be mounted cantilever-fashion, but can also be fixed against the bottom of the glass plate. The thickness of the glass plate then provides the required distance from the original plane.

The apparatus according to the invention is provided with a determining unit that determines, from the image data generated in relation to the aligning element, mutual positional differences in the sub-scanning direction between two adjoining sensors and is also provided with a digital delay circuit for delaying the digital data from at least one sensor to eliminate the positional differences.

In one embodiment, the digital delay circuit includes a number of series-connected shift registers each having a length of one scan line, and a selection circuit, which selects one of the shift registers to deliver image data from the associated sensor on the basis of the measured positional differences. The selection circuit divides the measured positional differences by the distance between two consecutive scan lines and thus calculates the number of scan lines between the image data from the two sensors. By selecting the shift register corresponding to the calculated number, the correct scan lines are connected to one another.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

The invention will now be explained with reference to the above figures wherein like references denote like parts.

Figure 2:
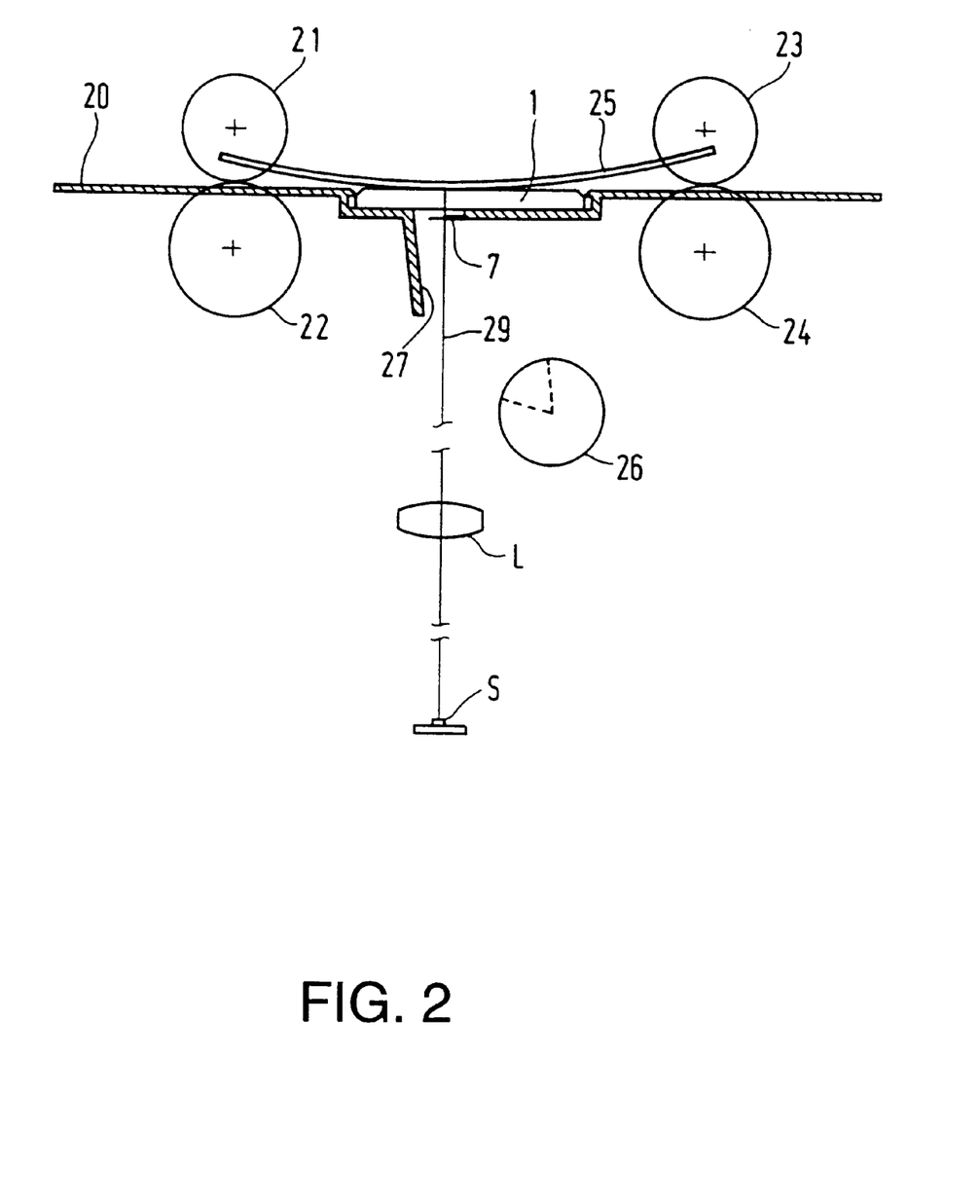
FIG. 2 is a side elevation showing the principle of an apparatus according to the invention.

FIG. 2 is a side elevation showing the principle of an apparatus according to the invention. A copyboard 20 and a glass plate 1 together form an original image plane over which a document to be scanned can be transported along the sensor system. The sensor system includes lenses L and sensors S. Each of the sensors S may be constructed with, for example, a CCD array. The sensors S are disposed in the direction perpendicular to the drawing plane and in extension of one another.

The document to be scanned (not shown) is transported from left to right between two driven roller pairs 21, 22 and 23, 24 respectively. A pressure-application plate 25 presses the document against the glass plate 1. A tubular lamp 26 illuminates the document from the bottom directly. Tubular lamp 26 also illuminates the document indirectly via the reflector 27. Pressure-application plate 25, which is painted white, forms a second reflector that reflects light passing through the document into the optical system.

The line 29 indicates the optical path between the scanned part of the document and the sensors S, through the lenses L. This optical path contains an aligning element 7, which in this exemplary embodiment is formed by a thin rod having a tapering diameter, just beneath the glass plate 1, in the direction of document transport.

The front elevation of the apparatus is similar to the apparatus shown in FIG. 1A (with the conventional aligning element 2 being replaced by the inventive aligning element 7). Therefore, the front elevation of the invention will be explained with reference to FIG. 1A. In this exemplary embodiment, the sensor system includes two sensors S1, S2, each having a lens L1, L2. Each of the sensors senses a linear area of the document through its lens. These linear areas, which have the width of one pixel, e.g. approximately 60 $\mu$m, are hereinafter referred to as the observation area and are indicated by O1 and O2, respectively.

As shown in FIG. 1A, the observation areas O1 and O2 overlap each other to a small extent. The aligning element 2 (which is to be replaced by the inventive aligning element 7) is disposed at a short distance beneath the glass plate 1 in the overlapping part of the fields of view of each of the two sensors S1 and S2. The distance between the aligning element 7 and the original image plane is selected such that the aligning element 7 is still imaged sufficiently sharply on the sensors S1, S2 to enable the edges thereof to be recognized.

Figure 3:
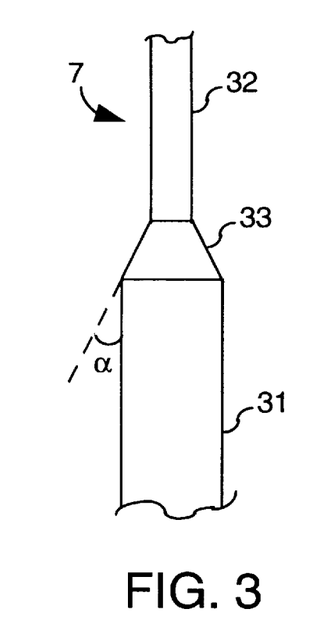
FIGS. 3, 3A, 3B, 3C and 4 show examples of aligning elements that may be used in the apparatus of FIG. 2.

An inventive aligning element 7 that replaces the conventional aligning element 2 is shown in an enlarged scale in FIG. 3. The ends 31 and 32 are cylindrical with a substantially constant diameter, and the middle part 33 has a diameter which tapers continuously from the diameter of end 31 to the diameter of end 32. The aligning element may also be described by revolving a planar shape around an axis extending in the sub-scanning direction.

The middle part 33 is used for the adjustment as will be explained hereinafter. Real values for the diameters of the ends 32, 31 are 1 and 4 mm respectively, while the apex angle $\alpha$ of the cone described by the middle part 33 is, for example, 60 degrees. Of the parts 31, 32 and 33 shown in FIG. 3, only the middle part 33 is essential. The other parts need not necessarily be present but are added here for mounting purposes.

Figure 3A:
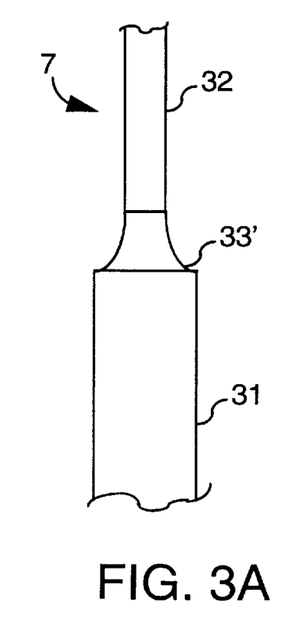

In the exemplary aligning element 7 shown in FIG. 3, the middle part 33 is purely conical, but the taper could also be curved as shown in FIG. 3A. More specifically, the aligning element 7 shown in FIG. 3A has a curved middle part 33'.

Figure 3B:
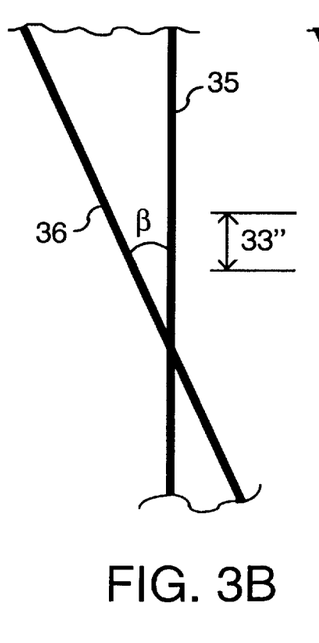
Figure 3C:
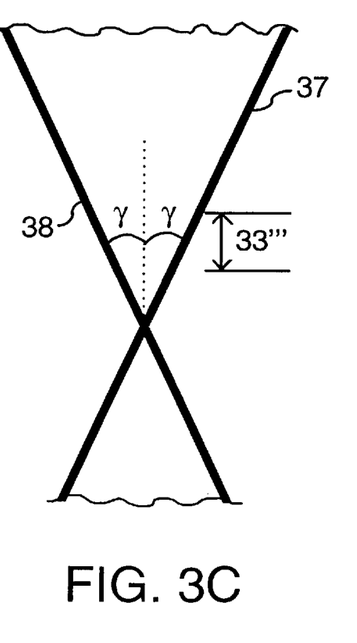

Other usable shapes for the aligning element 7 are, for example, a flat element or an assembly of wires extending in intersecting directions, preferably situated in a plane parallel to the glass plate 1. FIGS. 3B and 3C illustrate this assembly of wires. As shown in FIG. 3B, the aligning element 7 may be constructed with two stretched wires or two thin rods 35,36, so fixed that their projections onto the original image plane extend at an angle to one another. The example shown in FIG. 3B aligns one such wire or rod element 35 in the subscanning direction and the other element 36 in a direction forming an acute angle $\beta$ therewith to form a middle part 33". Another example is shown in FIG. 3C in which two elements 37, 38 each extend at an acute angle $\gamma$ relative to the subscanning direction to thus form a symmetrical middle part 33'".

The aligning element can also be formed by a pattern of, for example, paint applied to the bottom of the glass plate 1. The important factor is that the image of the aligning element 7 detected by the sensors S1, S2 should have two recognizable positions in the main scanning direction, wherein the positions have a previously known relationship with positions in the sub-scanning direction.

To construct the scanner apparatus, the sensors S1, S2 are accurately mounted in position by suitable hardware which are not described in detail here. After the adjustment, the observation areas O1, O2 of the two sensors S1, S2 are substantial extensions of one another and overlap in the main scanning direction, in such manner that the aligning element 7 is situated substantially opposite to the middle of the overlapping part of the observation areas O1, O2 and the middle part 33 of the aligning element 7 is intersected approximately half-way by the observation areas O1, O2. Impacts or other physical shocks to the apparatus, e.g. on moving it or misalignment caused by disposing the apparatus on an uneven floor, may distort the adjustment of the sensors S1, S2 to some extent. Usually, the observation areas O1, O2 are then displaced over a short distance, so that they no longer connect-up in the sub-scanning direction and their overlap is different. Rotation of the sensors S1, S2 is also possible, but in practice this is so small that no correction is generally required.

Figure 4:
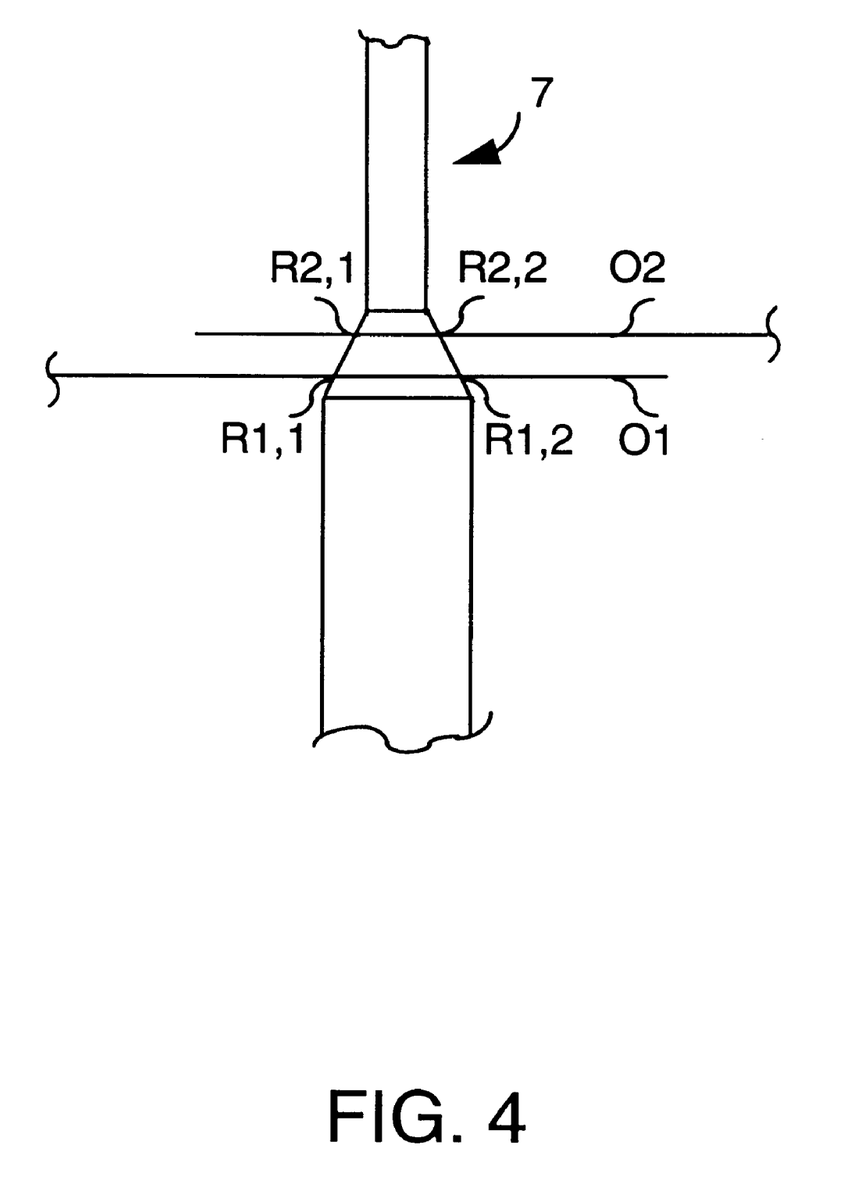

FIG. 4 shows the condition after a displacement of the sensors S1, S2. FIG. 4 also shows the aligning element 7 and the two observation areas O1 and O2. The points of intersection R1,1 and R1,2 of O1 with the edges of the aligning element 7 and the points of intersection R2,1 and R2,2 of O2 with the edges of the aligning element 7 are also indicated. As a result of the imaging of the observation areas O1, O2 on the sensors S1, S2 these intersection points coincide with individual CCD elements of the sensors and, because the CCD elements are distributed uniformly, also coincide with coordinates within the sensors S1, S2.

Figure 5:
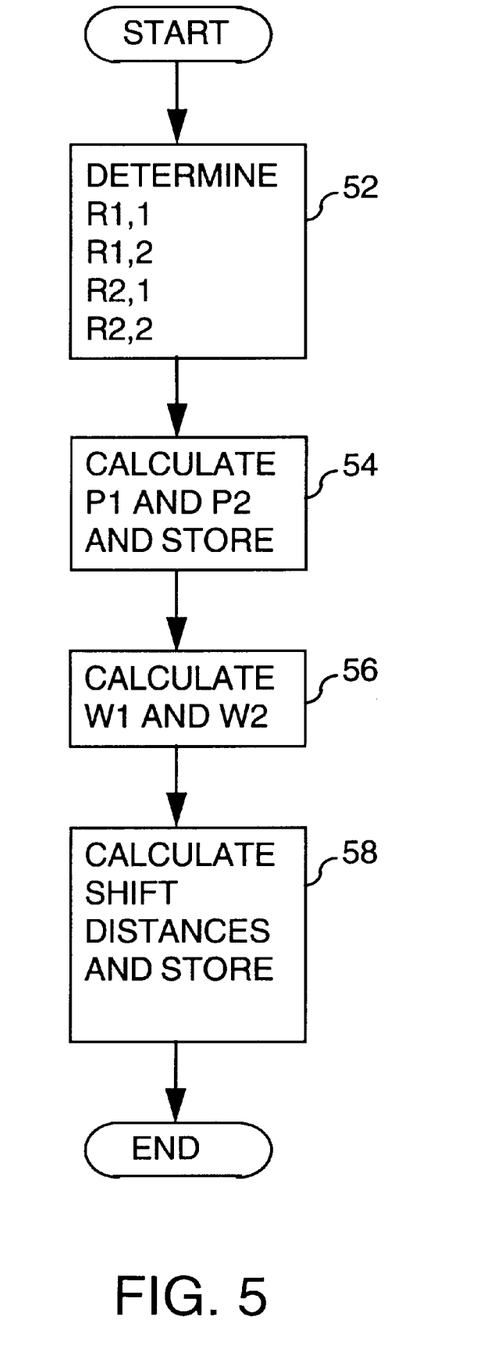
FIG. 5 is a description of a procedure for determining correction values.

The procedure for determining the correction values required to compensate for any deviations in the adjustment of the sensors S1, S2 is shown in FIG. 5. A scan is made without any document so that only the aligning element 7 is visible against the white pressure-application plate 25. The coordinates of the points of intersection R1,1, R1,2, R2,1 and R2,2 are first determined in step 52 from the digital image data generated by the sensors S1, S2.

In step 54, the centerpoints M1=(R1,2+R1,1)/2 and M2=(R2,2+R2,1)/2 are calculated and stored in a memory. From these centerpoints M1, M2, the connecting points where the image data of sensor S1 and the image data of sensor S2 are connected to one another during the scanning of documents are calculated by adding, from points M1 and M2 respectively, a number of pixels (CCD elements) that are experimentally predetermined, to the middle of the sensor.

This is necessary because the aligning element does not lie in the original image plane and the sensors S1, S2 detect the aligning element 7 from two directions at an angle, so that parallax occurs. In this way, point P (FIG. 1A) is determined, which forms the perpendicular projection of the center of the aligning element 7 onto the original image plane. This point is chosen as the connecting point for the image data from the sensors S1 and S2. The point P is indicated by P1 and P2 in the image data from the sensors S1 and S2, respectively. Of course, any other point situated in the free field of view of the two sensors can be selected as the connecting point. Determination thereof in the image data is similar.

In step 56, the widths W1=R1,2−R1,1 and W2=R2,2−R2,1 of the projection of the aligning element 7 on the sensors S1 and S2, respectively are calculated. These widths W1, W2 are converted to a mutual distance A in accordance with the formula $$A = 0.5 * (W2 - W1)/\tan a$$

where a is half the apex angle α of the conical part of the aligning element 7.

When scanning documents, the image data from the sensor S1 or S2 must be delayed by a time interval corresponding to the transport of the document over the distance A (the choice of the sensor is determined by the sign of A). The value A is expressed in units of the distance between the scan lines and converted to two values A1 relating to sensor S1, and A2 relating to sensor S2. The values A1 and A2 are also stored in a memory.

Figure 6:
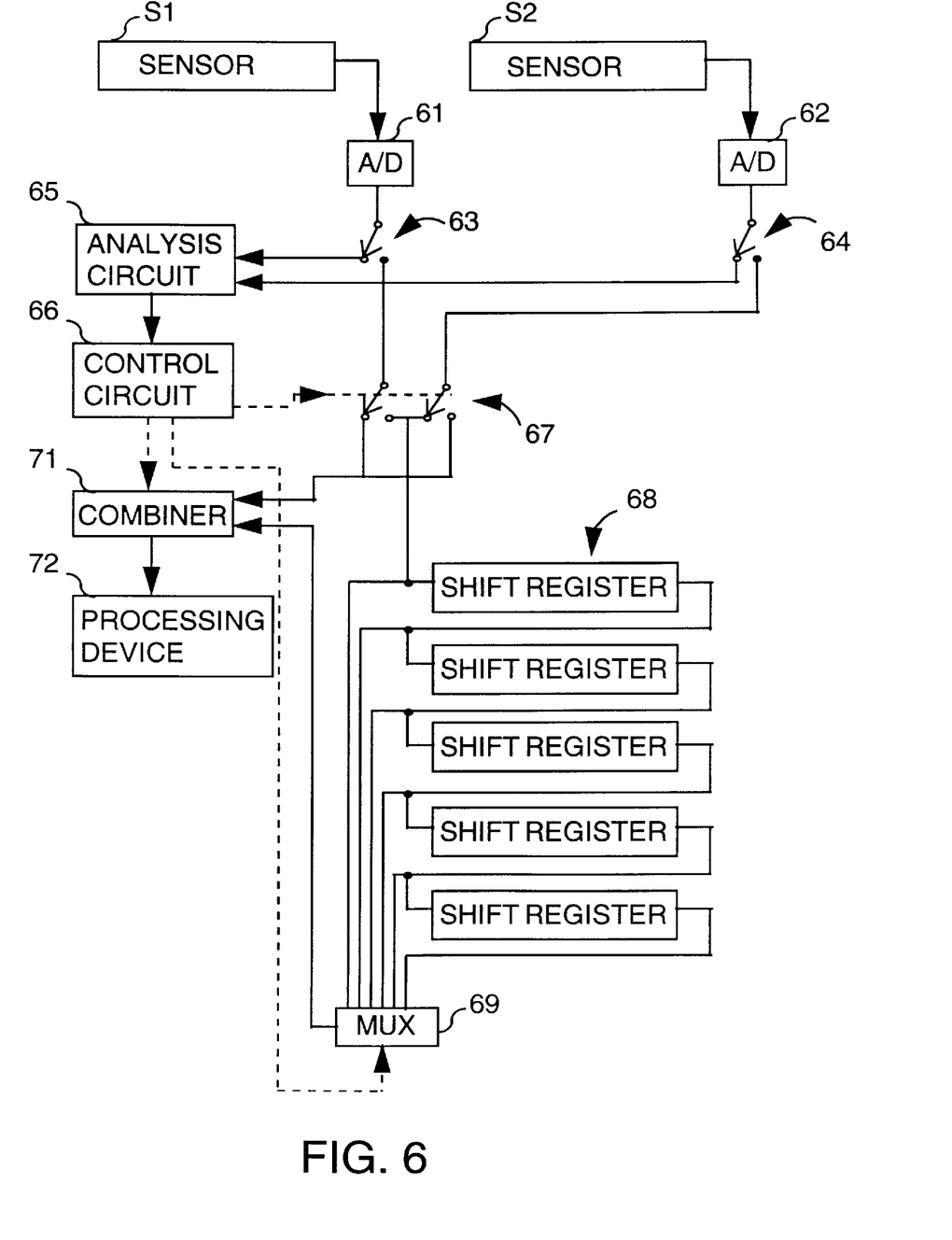
FIG. 6 is a diagram showing a circuit for compensating for deviations in the adjustment of the sensors.

FIG. 6 is a diagram showing a circuit for compensating deviations in the adjustment of the sensors S1 and S2, based on the correction factors calculated in accordance with the above description.

The sensors S1 and S2 are each connected to an analogue/digital (A/D) converter 61 and 62 respectively, and deliver analogue serial image data thereto. The analogue image data are converted to digital serial image data by the A/D converters 61, 62.

A/D converter 61 is connected to a switch 63 and A/D converter 62 is connected to a switch 64. During the procedure for determining the correction values as described with reference to FIG. 5, the switches 63 and 64 are in the state shown in FIG. 6 and connect the sensors to an analysis circuit 65 which performs the procedure described above.

The analysis circuit 65 is connected to a control circuit 66, which will be described hereinafter, and delivers thereto the correction values P1, P2, A1 and A2. The control circuit 66 is provided with a memory for the temporary storage of the correction values.

After the procedure for determining the correction values has been performed, the switches 63 and 64 are set to their other mode, in which they connect the A/D converters 61 and 62 to a switching unit 67 which connects one of the A/D converters to a combining circuit 71 and the other A/D converter to a bank 68 of series-connected shift registers. The shift registers have a length of one scan line of the sensors S1, S2. The individual shift registers are connected to a multiplexer 69. Together with the multiplexer 69 the shift registers form a delay circuit having a delay selectable in units of one scan line spacing. The state of the switching unit 67 determines which of the two sensor signals is delayed.

The multiplexer 69 is, in turn, connected to the control circuit 66 and its output is connected to combining circuit 71, which is also connected to a processing device 72 (not described in detail) for the digital image data, e.g. a printing device.

During the scanning of a document, the digitized image data from one of the sensors S1 and S2 are delayed by passing them through the shift register bank 68. The multiplexer 69 passes the image data from one of the shift registers under the control of the control circuit 66 in such manner that the image data being passed relates to the same position in the sub-scanning direction on the document, despite any displacement of the sensors S1 and S2.

The scan lines thus delayed are fed by the multiplexer 69 to the combining circuit 71, which combines them with the scan lines from the other sensor, received directly from the switching unit 67. In this way, combining circuit 71 removes from the scan lines of both sensors the image data originating from the end that is overlapped by the other sensor, to the position P1 and P2 respectively, and combines the remaining image data to form a complete image line. The combining circuit 71 is constructed in manner generally known per se so that the scan lines incoming simultaneously from the two sensors are placed in the correct time sequence. The resulting image lines are fed consecutively to a processing circuit.

It should be noted here that the term "circuit" does not mean solely hardware, but also can mean a microprocessor loaded with suitable software.

In the above-described exemplified embodiment only one aligning element 7 is provided in the overlapping area of the observation areas O1, O2 associated with the sensors S1, S2. Of course, it is also possible to provide, just outside the area for scanning, alignment bodies 7 at the free ends of the complete field of view formed by the combination of the observation areas. In this way, for each of the observation areas, position determination in the sub-scanning direction becomes possible for both ends, so that it is possible to determine from this any skewing of the sensors so that it is also possible to correct the same.

In the above description, the invention is equipped with two sensors, but the invention can be provided with more than two sensors that have an observation area overlapping the observation area of the adjoining sensors. In that case, an aligning element 7 is provided in each of the overlapping areas.

The invention being thus described, it will be obvious that the same may be varied in many ways. Such variations are not to be regarded as a departure from the spirit and scope of the invention, and all such modifications as would as would be obvious to one skilled in the art are intended to be included within the scope of the following claims.

I claim:

1. An apparatus for optically scanning a document to generate digital image data corresponding to local optical densities of the document, the apparatus comprising:

a fixed glass plate, one side of which defines an original image plane, a transporting mechanism for transporting the document in a sub-scanning direction in the original image plane, at least two linear sensors situated in a main scanning direction, each of said linear sensors including an array of opto-electric converters and a lens which images a linear observation area situated in the original image plane on said sensor, the observation areas of said sensors being substantially in line and partially overlapping at ends thereof in the main scanning direction, an aligning element situated between the lenses and the original plane at a short distance from the original plane in a position such that a perpendicular projection onto the original plane is situated within the overlapping ends of two adjoining observation areas, said aligning element having a width in the main scanning direction that monotonically increases or decreases as a function of the sub-scanning direction; and said aligning element being of sufficiently small size relative to the arrays of opto-electric converters so that skew of said arrays can be disregarded as negligible in a determination of displacement of said arrays in said sub-scanning direction.

2. The apparatus according to claim 1, wherein the width of said aligning element tapers linearly with the sub-scanning direction.

3. The apparatus according to claim 1, wherein the width of said aligning element tapers curvilinearly with the sub-scanning direction.

4. The apparatus according to claim 1, wherein said aligning element is a body described by revolving a planar shape around an axis extending in the sub-scanning direction, said aligning element being mounted beneath the glass plate.

5. The apparatus according to claim 1, wherein said aligning element is a flat body situated in a plane beneath the glass plate and substantially parallel thereto.

6. The apparatus according to claim 1, wherein said aligning element includes an assembly of two linear elements so fixed that their projections onto the original image plane extend at an angle to one another.

7. The apparatus according to claim 1, wherein said aligning element is fixed at one end without contacting said glass plate.

8. The apparatus according to claim 1, wherein said aligning element is fixed against an underside of said glass plate.

9. The apparatus according to claim 1, further comprising:
means for determining, from the image data generated in relation to said aligning element, mutual positional differences in the sub-scanning direction between at least two of said adjoining sensors.

10. The apparatus according to claim 9, wherein said means for determining the mutual positional differences determines the widths of said aligning element based on the image data from each of said adjoining sensors and calculates the mutual positional differences in the sub-scanning direction from the difference between these widths.

11. The apparatus according to claim 10, further comprising:
digital delay means for delaying the digital data from at least one of said sensors to eliminate the positional differences in the sub-scanning direction.

12. The apparatus according to claim 11, wherein said digital delay means includes a plurality of series-connected shift registers each having a length of one scan line, and selection means which selects, on the basis of the measured positional differences, one of said shift registers to deliver image data from an associated one of said sensors.

13. A method of compensating for connection errors between digital image data generated by two linear opto-electric sensors each having a lens which images a linear observation area onto the sensor, the observation areas of the sensors being substantially in line and partially overlapping at the ends in a main scanning direction, the sensors being situated next to one another in their longitudinal direction in an apparatus for optically scanning a document provided with a fixed glass plate, one side of which defines an original image plane, and a transporting mechanism for transporting the document in a sub-scanning direction in the original image plane, the method comprising the steps of:

providing an aligning element having a width in the main scanning direction which monotonically increases or decreases as a function of the sub-scanning direction at a position situated between the lenses and the original image plane, at a short distance from the original image plane, said aligning element being of sufficiently small size relative to said sensors so that skew of said sensors can be disregarded as negligible in a determination of displacement of said sensors in said sub-scanning direction within the overlapping ends of two adjoining observation areas;

test scanning to generate image data of the aligning element;

determining a detected width of the aligning element from the image data generated during said test scanning step; and determining a positional difference in the sub-scanning direction of two adjoining sensors from a difference in the detected widths in the image data of the two adjoining sensors and the shape of the aligning element.

14. The method of claim 13, further comprising:
compensating for positional differences in the sub-scanning direction of the two adjoining sensors as determined during said test scanning step by delaying digital image data from at least one of the two adjoining sensors.

* * * * *

UNITED STATES PATENT AND TRADEMARK OFFICE
CERTIFICATE OF CORRECTION

PATENT NO. : 5,990,470
DATED : November 23, 1999
INVENTOR(S) : Wilhelmus P.J. Classens It is certified that error appears in the above-identified patent and that said Letters Patent is hereby corrected as shown below:

Title page,
Item [73], Assignee, change "Octe,acu etee-Technologies B.V., Ma Venlo, Netherlands" to -- Océ-Technologies B.V.
                    Ma Venlo, Netherlands --.

Signed and Sealed this

Eighteenth Day of October, 2005

JON W. DUDAS
*Director of the United States Patent and Trademark Office*